Figure 1:
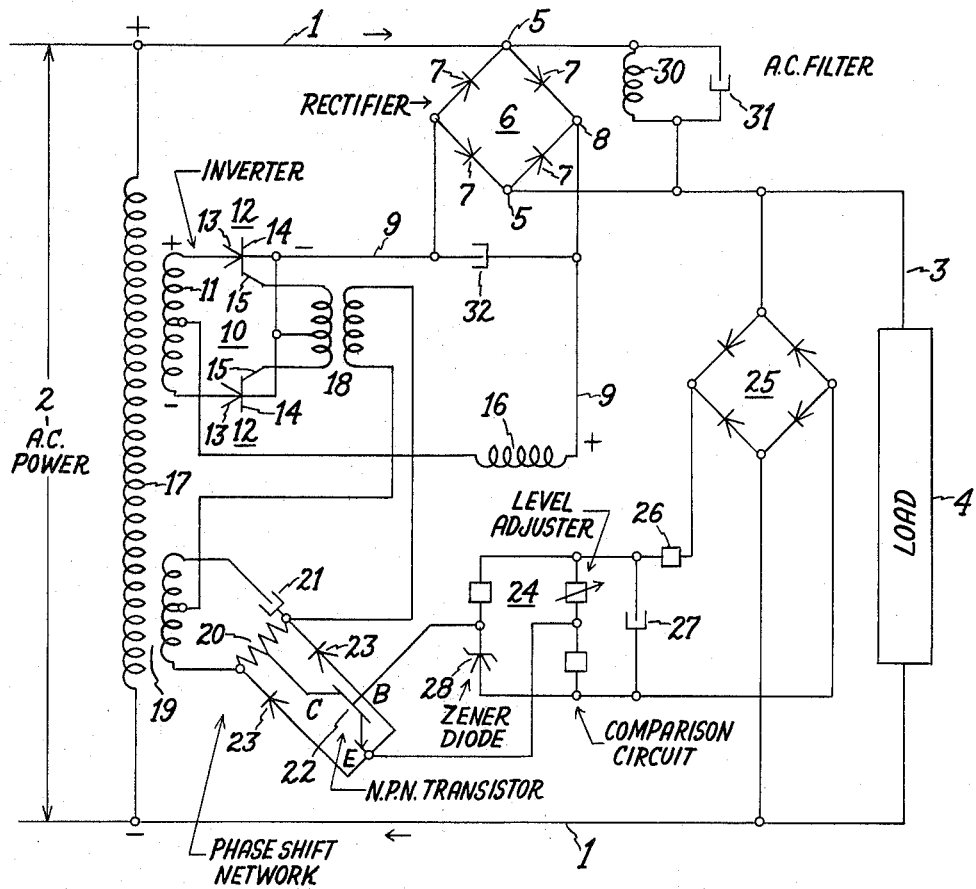

Feb. 1, 1966     B. D. BEDFORD     3,233,165
VOLTAGE REGULATOR WITH RECTIFIER AND
PHASE CONTROLLED SCR INVERTER
Filed May 10, 1963     4 Sheets-Sheet 1

Inventor,
Burnice D. Bedford,
by Gilbert P. Tarleton
His Attorney.

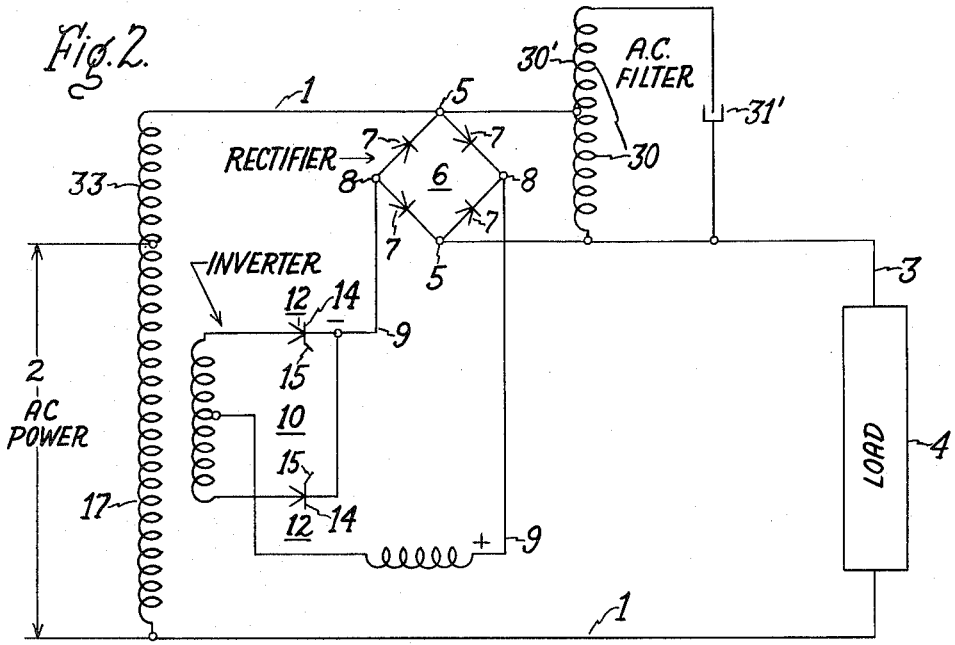
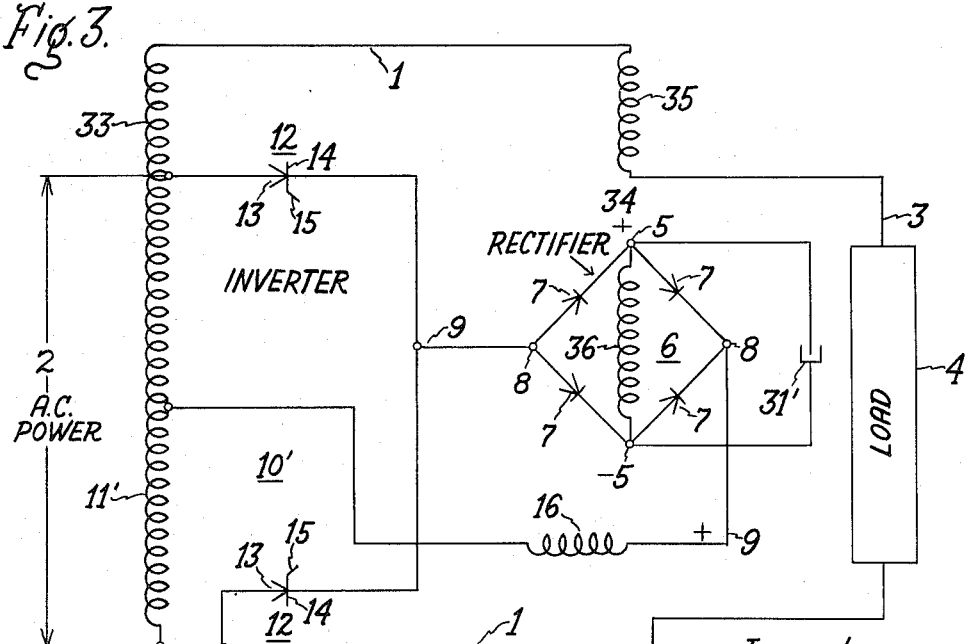

Feb. 1, 1966     B. D. BEDFORD     3,233,165
VOLTAGE REGULATOR WITH RECTIFIER AND
PHASE CONTROLLED SCR INVERTER
Filed May 10, 1963     4 Sheets-Sheet 3
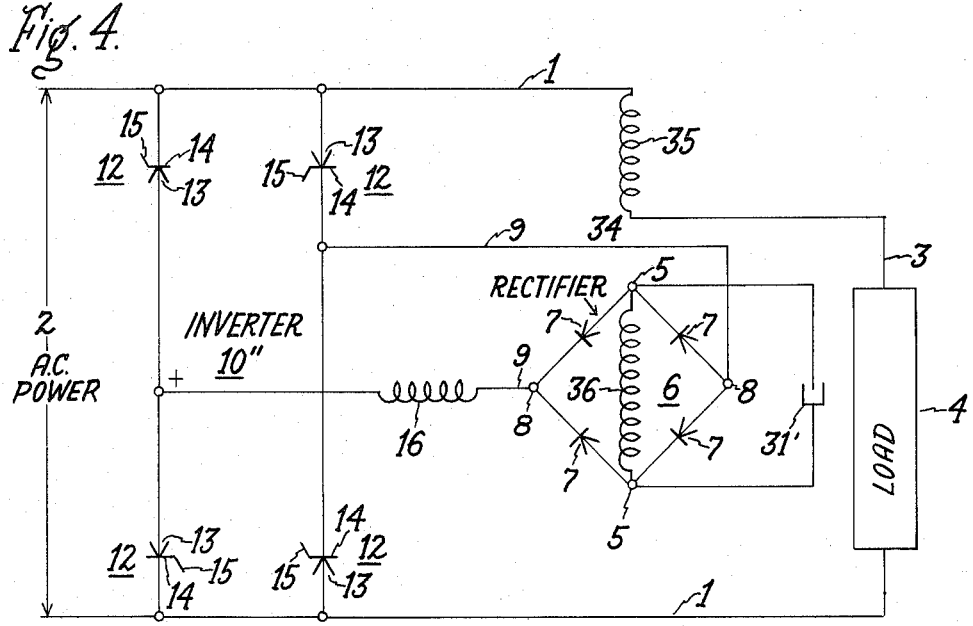
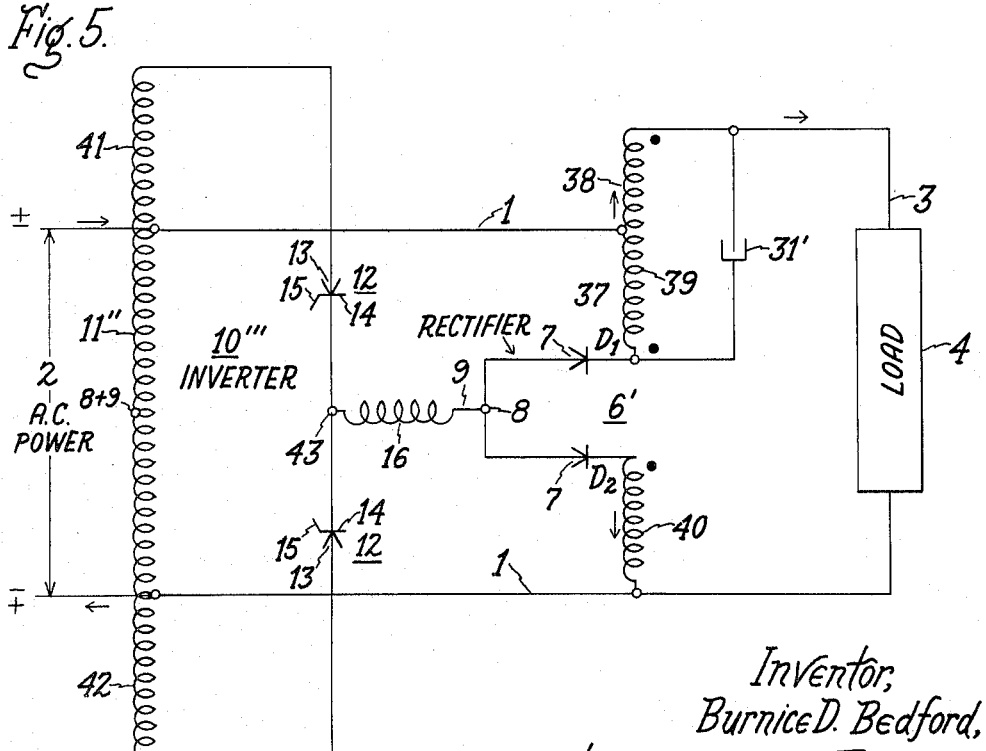
Inventor:
Burnice D. Bedford,
by *Gilbert P. Tarleton*
His Attorney.

Inventor,
Burnice D. Bedford,
by —————
His Attorney.

United States Patent Office 3,233,165
Patented Feb. 1, 1966

3,233,165
VOLTAGE REGULATOR WITH RECTIFIER AND PHASE CONTROLLED SCR INVERTER
Burnice D. Bedford, Scotia, N.Y., assignor to General Electric Company, a corporation of New York
Filed May 10, 1963, Ser. No. 279,584
21 Claims. (Cl. 323—22)

This invention relates to electrical regulators for alternating current supply circuits and more particularly to improvements in static control circuits employing silicon control rectifier type electric valves.

The principal element or component of the invention is an electronic converter. By an electronic converter is meant an electronic rectifier and an electronic inverter which have a D.-C. link. The alternating current side of the rectifier is effectively connected in series and the alternating current side of the inverter is effectively connected in shunt circuit relation to the alternating current supply circuit to be regulated. Thus rectified alternating load current is inverted against a counter alternating voltage provided by the supply circuit to provide a bucking series alternating regulating voltage reflected through the rectifier into the supply circuit. By phase controlling the inverter the magnitude of the series bucking voltage is varied to regulate the load voltage. The shunt connection may be on either the source or load side of the series connection.

An object of the invention is to provide a new and improved static regulator circuit.

Another object of the invention is to provide a new and improved static voltage regulator circuit comprising a phase controlled electric valve inverter and a multi-diode type rectifier.

A further object of the invention is to provide a static, fast, efficient, accurate, reliable and quiet alternating voltage control circuit.

The invention will be better understood from the following description taken in connection with the accompanying drawings and its scope will be pointed out in the appended claims.

Figure 6:
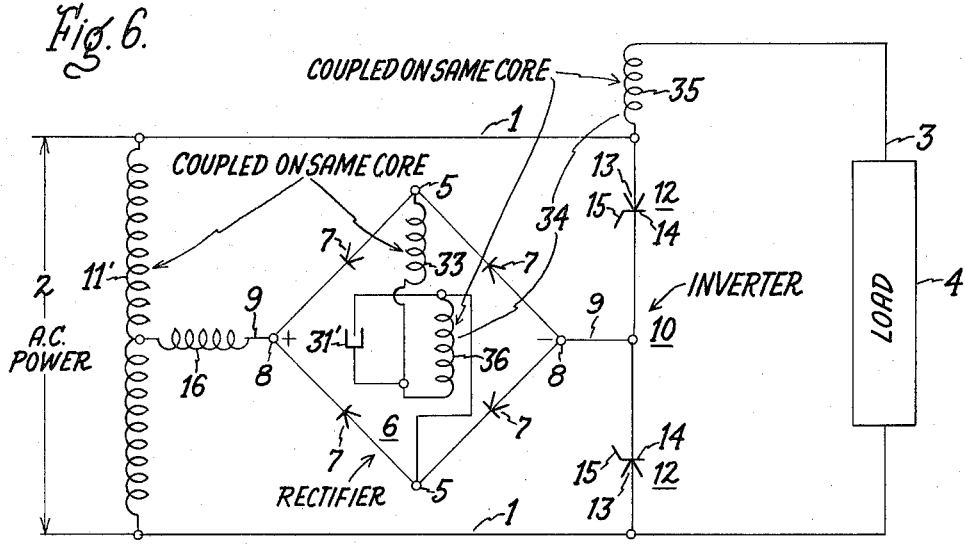
Figure 7:
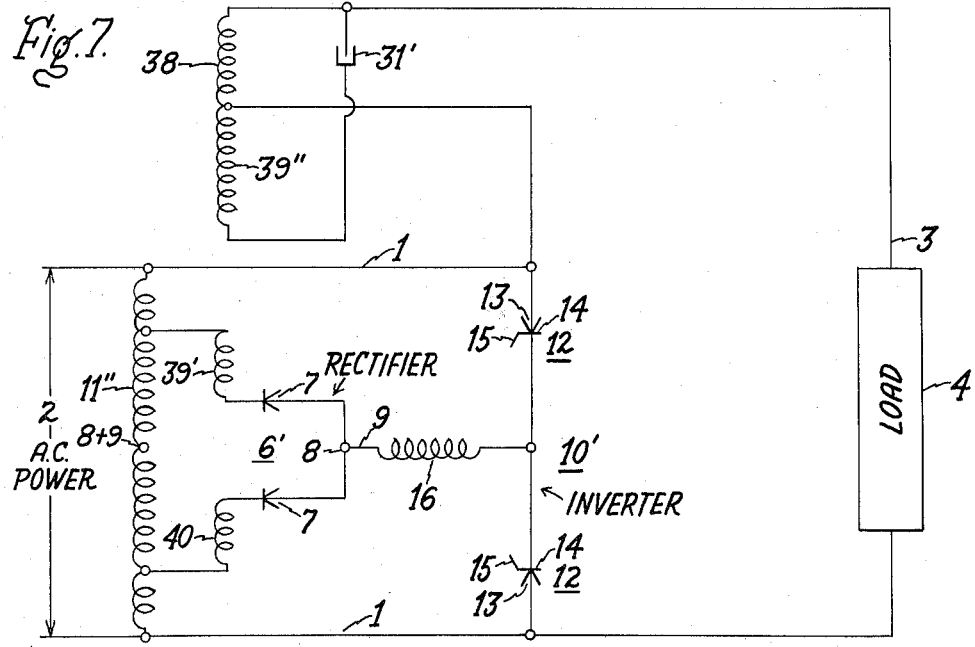

In the drawings,

FIG. 1 is a diagrammatic representation of an automatic voltage regulator circuit embodying the invention, FIG. 2 is a modification of the power, as opposed to control, part of the circuit of FIG. 1 for providing both voltage buck and boost control or regulation as contrasted with FIG. 1 which provides only voltage bucking control or regulation and for providing a more economical type of alternating current filter, FIG. 3 is a modification of FIG. 2 in which the A.-C. filter reactor transformer is also used to step up the voltage of the rectifier diodes and in which higher voltage valves or silicon controlled rectifiers are used in the inverter, FIG. 4 is a further modification for bucking only by employing a full-wave, four-valve inverter connected directly across the supply line so as to eliminate the use of an inverter transformer, FIGS. 5, 6, and 7 are further modifications in which the regulating series voltage is reversible for giving both buck and boost by including some of the supply voltage in series with the high side of the transformer and rectifying the combined voltages.

Referring now to the drawings and more particularly to FIG. 1, there is shown therein an alternating current supply circuit 1 having a source or power side or end 2 and a load end or side 3 across which a load 4 is connected. Serially connected in one conductor of the circuit between its source end and its load end is the alternating side 5 of a full wave bridge connected rectifier 6 which may comprise simple diodes 7 of any suitable type. The direct current side 8 of the rectifier 6 is connected to the direct current side 9 of an A.-C. line voltage commutated inverter 10, i.e., they have a D.-C. link. The inverter 10 is structurally the same as a midtap connected bi-phase rectifier having a midtapped transformer winding 11 to whose terminals are connected phase controlled electric valves such as silicon controlled rectifiers 12. Such devices are well known in the art and are sometimes called solid state thyratrons. For present purposes they may be considered merely as having an anode 13, a cathode 14 and a control electrode 15 commonly called a gate electrode. As shown the cathodes are interconnected to constitute one terminal of the direct current side of the inverter. The other terminal of the direct current side of the inverter is connected through an inductance or reactor coil 16 to the midpoint of the winding 11. This inductance or reactor is necessary for providing proper commutation of the valves 12. The alternating current side of the inverter 10 is effectively connected in shunt circuit relation to the main alternating current supply circuit by inductively coupling it to a winding 17 which is connected across that circuit.

The circuit 10 is made to operate as an inverter by gating the rectifiers 12 between 90 and 180 electrical degrees after their reverse voltage drops to zero, reverse voltage meaning when their cathodes are positive with respect to their anodes, and forward voltage meaning when their anodes are positive with respect to their cathodes, the devices only permitting current to flow from anode to cathode, i.e., in the forward direction. Such inverter operation of rectifiers is per se old and well known in the art and is described more fully, for example, in an article, and the references cited therein, entitled, "Solid-State Power Inversion Techniques," by the present inventor and other in Semiconductor Products, New York, N.Y., March 1960, pp. 55–56; April 1960, pp. 50–55.

The gates 15 can be phase controlled in any suitable manner either by manual control or automatically. As shown they are connected respectively to the ends of the secondary winding of a gate transformer 18 whose midpoint is connected to their cathodes. The primary winding of the gate transformer 18 is connected across the output terminals of a voltage phase shifting network which is energized by a tertiary winding 19 coupled to the winding 17. The phase shifting network is of the variable impedance type and is shown by way of example as of the resistor-capacitor type having a resistor 20 and a capacitor 21 connected in series across the winding 19, the output terminals of the phase shift network being the junction of the resistor 20 and capacitor 21 and the midpoint of the winding 19. It will, be course, be understood, however, that other impedance elements or combinations thereof can be used. For example, the resistor 20 can be replaced by an inductor.

When the ohmic values of the resistor 20 and capacitor 21 are equal, the output voltage of the phase shifting network is ninety degrees phase displaced from the supply voltage or the voltage applied to the anode cathode circuits of the silicon controlled rectifiers 12. This condition represents the start of inverter operation of the inverter and minimum D.-C. voltage of the inverter. Increasing the phase angle beyond ninety degrees, as by reducing the effective value of the resistor 20, turns the inverter on more and more and increases the D.-C. voltage of the inverter until it reaches its maximum when the phase of the gate impulses or excitation is 180 degrees after the reverse voltages of the silicon control rectifiers pass through zero. In fact, the D.-C. voltage of the inverter is proportional to the cosine of this angle whose negative sign indicates that the D.-C. voltage of the inverter in a bucking voltage with respect to the voltage with respect to the voltage of the D.-C. side 8 of the rectifier 6. This inverter operation can be further explained as follows. During a positive half cycle, i.e., of positive voltage on the upper A.-C. line 1, the half cycle starts with the lower valve 12 conducting. In the middle of the positive half cycle upper valve 12 is made conducting. The average inverting voltage for the whole half cycle is zero. For maximum inverting voltage the lower valve 12 is forced to conduct practically the entire positive half cycle. The excitation to the upper valve is delayed 160 to 170 degrees allowing 10 to 20 degrees for commutation. Phase shift of 180 degrees allows nothing for commutation and a practical circuit could not commutate any load current.

Automatic control or regulation may be obtained by shunting the resistor 20 with a variable resistor which as shown may take the form of a simple NPN type transistor 22 whose collector is connected to the midpoint of the resistor 20 and whose emitter is connected to opposite ends of resistor 20 through simple diode valves 23 for properly polarizing the transistor electrodes. This gives limited control because the variable resistor represented by the transistor 22 is effectively parallel by the fixed resistor 20. Wider control can be obtained substituting diodes for the two halves of resistor 20 so connected that with diodes 23 they comprise a bridge rectifier. The base and the emitter of the transistor 22 are respectively connected to diametrically opposite points of a resistor bridge circuit 24 which is supplied with direct current proportional to the voltage of the load 4 by means of a full wave bridge connected rectifier 25. A ballast resistor 26 may be connected in the circuit and a filter capacitor 27 may be connected across the circuit. The bridge 24 has a reference device, such as a Zener diode 28, which as is well known is a device which exhibits remarkably constant voltage drop over a wide range of currents through it due to an avalance effect. This element therefore corresponds to a reference or comparison standard against which the load voltage is measured. The load voltage level may be adjusted to any desired value by making one or more of the other resistors of the bridge an adjustable resistor as indicated.

The circuit may be so adjusted that at the desired load voltage the bridge is sufficiently unbalanced in such a direction as to supply a uni-directional voltage between the gate and emitter of the transistor 22 of such magnitude and polarity as to cause the effective resistance of the transistor 22 between its collector and emitter to be such as to reduce the effective resistance of the phase shift network to such a value as to turn the inverter about half way on so that its voltage when reflected through the rectifier 6 into the supply circuit produces an alternating bucking voltage of such magnitude as to produce the desired load voltage, i.e., the supply voltage minus the bucking voltage is equal to the desired load voltage. If now the load voltage departs from the desired value for any reason the bridge will become more or less unbalanced so as to provide more or less control bias on the transistor 22 so as to effectively vary the resistance of the phase shift network and shift the phase of the gates of the inverter 10 so as to vary its D.-C. voltage in the proper direction so that the resulting change in bucking voltage will bring the load voltage back substantially to the desired voltage. The circuit can be made very sensitive so that a very small percentage change in load voltage can either turn the inverter full off or full on so as to bring into play the entire range of control or regulation of the circuit.

FIG. 1 is provided with both an A.-C. filter in the form of a reactor 30 and a capacitor 31 connected in parallel across the alternating current side of the rectifier 6 and a D.-C. filter in the form of a capacitor 32 connected across the D.-C. side of the rectifier 6. Both filters, of course, do not have to be used at the same time. The D.-C. filter 32 is the more economical for use in applications where the wave shape is not critical. On the other hand, the A.-C. filter produces the better output wave shape.

While the circuit of FIG. 1 has been shown as an automatic voltage regulator circuit it will, of course, be obvious that its comparison circuit or non-linear bridge 24 may be made responsive to any desired function of the voltage of the supply circuit such as the temperature of a resistance furnace supplied by the supply circuit, in which case, of course, the system would be an automatic temperature regulator instead of an automatic voltage regulator. Obviously, many other primary variables which are a function of the load voltage may be caused to control the system.

In the modification shown in FIG. 2 the transformer winding 17 across the supply voltage end 2 of the circuit has an extended series winding 33 for boosting the output or load voltage. In this way, the system can be made to both buck and boost the voltage. For example, if the voltage of the extended winding 33 is half the maximum bucking voltage produced by the inverter 10 then with the inverter 10 full off the circuit will produce a maximum boosting voltage. With the inverter 10 half way on the circuit will produce no net buck or boost as the bucking voltage will cancel the boost voltage, and with the inverter 10 full on the circuit will produce a bucking voltage equal to half the D.-C. voltage of the inverter 10.

Another difference between FIG. 2 and FIG. 1 is that the A.-C. filter reactor 30 has an extended winding 30' across which a higher voltage capacitor 31' is connected. This permits obtaining the required amount of capacitive filtering volt-amperes with a less expensive high voltage low current capacitor.

FIG. 2 may be controlled automatically in any suitable manner such, for example, as by the control circuit shown in FIG. 1.

The modification shown in FIG. 3 permits the use of higher voltage low current and hence less expensive rectifier and inverter valves. Thus the step-up autotransformer filter reactor 30–30' of FIG. 2 is changed to a two winding series transformer 34 having a low voltage winding 35 serially connected in the load side 3 of the supply circuit 1 and a high voltage winding 36 connected across the input side 5 of the rectifier 6 and across which the filter capacitor 31' is also connected. Thus while the variable A.-C. series bucking voltage inserted in the supply circuit by the winding 35 may be comparable in magnitude to the corresponding voltage in FIGS. 1 and 2 the voltage of the rectifier 6 can be made very much higher through the voltage transformation obtained by the transformer 34. Similarly the voltage of the inverter 10' and its components is increased by connecting the A.-C. side of the inverter directly across the supply side 2 of the supply circuit 1 instead of across the comparatively low voltage winding 11 as in FIGS. 1 and 2. The inverter transformer 11''s rating is also reduced when the inverter works directly on the supply voltage.

The operation of FIG. 3 is otherwise the same as the operation of FIG. 2 in that the adjustable or controllable series bucking voltage inserted in the supply circuit by the winding 35 combines with the fixed boosting voltage of the extending winding 33 to produce the desired amount of boost and buck control or regulation.

FIG. 4 differs from FIG. 3 and the previous figures in that the inverter 10'' is a full wave four valve inverter connected directly across the supply lines whereas in the previous figures the inverter has been a two valve bi-phase inverter having a midpoint connection so that each valve is only subjected to half the total voltage. The full wave four valve inverter is of course a bridge circuit and by simultaneously turning on one pair of diagonally opposite valves and alternately turning on the other pair of diagonally opposite valves the inverter can be made to force current into the A.-C. supply circuit against its voltage so as to produce the desired bucking D.-C. voltage of the inverter, the necessary commutation or turning off of the valves being obtained automatically through the combined action of inductance 16 and the periodic reversals of the valve voltages due to the alternating nature of the supply voltage.

The circuit of FIG. 4 will produce only a bucking voltage control or regulation similar to that of FIG. 1 and as with FIGS. 2 and 3 it may be controlled automatically by means similar to that shown in FIG. 1.

The circuits of FIGS. 5, 6, and 7 make good use of a transformer whose low voltage winding is in series with the load circuit in that the control range includes reversing its voltage. This result is obtained by including some of the supply voltage in series with the high voltage side of this transformer. The combined voltages are rectified.

Referring more particularly to FIG. 5, a transformer 37 is provided having a low voltage winding 38 in series with the load 4 and having a pair of equal high voltage windings 39 and 40 connected respectively in series with oppositely poled diodes 7 of a modified form of rectifier 6'. The inverter 10''' is of modified form having still higher voltage silicon controlled rectifiers 12 in that the inverter autotransformer winding 11'' has extended windings 41 and 42 for increasing the voltage of the silicon controlled rectifiers. Due to the symmetry of the circuit one terminal 8 of the rectifier 6' and one terminal 9 of the inverter 10''' are at the electrical midpoint of the winding 11', the other terminals 8 and 9 of the rectifier and inverter being as indicated. With this arrangement, the voltage of the inverter before it passes through the smoothing reactor 16 appears between the electrical midpoint of the winding 11'' and a point 43 located between the cathodes of the silicon controlled rectifiers 12 and the lefthand end of the smoothing reactor 16.

Due to the phasing back of the firing of the inverter valves 12 beyond 90 degrees in order to produce inverter action, the D.-C. voltage of the inverter will be a negative or bucking voltage which during alternate half cycles of the supply voltage will be opposite to the boosting voltage produced by opposite halves of the winding 11'' with respect to the high voltage windings 39 and 40 of the transformer 37.

The filter capacitor 31' is connected across the windings 38 and 39 in series so that together they constitute a voltage step-up series autotransformer for the filter capacitor 31' in a manner generally similar to that provided in FIG. 2 by the windings 30 and 30'.

The operation of FIG. 5 is as follows. During what may be referred to as the positive half cycles of load current, a current will be induced in the high voltage winding 40 which can flow through its serially connected diode 7 and through a circuit including the lower half of the autotransformer winding 11'' which applies boosting voltage, i.e., voltage in the circuit of the winding 40 which causes the series winding 38 to boost the load voltage and through the upper silicon controlled rectifier 12 of the inverter 10''' which applies a negative or bucking voltage serially in the circuit of the winding 40. If the windings 41 and 42 each have half the circuit voltage then when the inverter is just turned on, i.e., it is phased just beyond ninety degrees, its D.-C. voltage will be a minimum and the regulator will produce a maximum boosting effect. As the inverter is turned on further and further by phasing its gates toward 180 degrees the bucking voltage supplied by the inverter increases until when the inverter is turned half way on its voltage will be equal and opposite to the voltage supplied by the winding 11'' in which case the regulator will be in its neutral condition. Further phasing of the silicon controlled rectifier toward 180 degrees will increase the negative D.-C. voltage of the inverter to its maximum value when the phase angle is 180 degrees at which point the bucking voltage will be twice the boosting voltage and the regulator will be in its full bucking condition.

During negative half cycles of load current, current flows in the winding 39 through the upper diode 7 of the rectifier 6' and this circuit encounters a boosting voltage supplied by the upper half of the inverter autotransformer winding 11'' and a bucking voltage variable between zero and twice the boosting voltage appearing between the D.-C. terminals of the inverter so that the regulating voltage of the winding 38 can vary between a maximum boosting voltage through zero to a maximum bucking voltage.

The circuit of FIG. 5 can be either manually controlled or automatically controlled by any suitable means such for example as that shown in FIG. 1.

The modification shown in FIG. 6 like the modifications shown in FIGS. 3 and 4 has a voltage bucking series transformer 34 with a series winding 35 and a winding 36 connected between the A.-C. terminals of the bridge rectifier 6 and with the filter capacitor 31' connected in shunt with the winding 36. FIG. 6 is also like FIGS. 2 and 3 in that the inverter transformer or autotransformer winding 11' has an additional winding section 33 for providing a fixed voltage boost in the alternating current circuit. However, the voltage boosting winding 33 in FIG. 6 is connected in series with the high voltage winding 36 of the bucking series transformer 34 between the A.-C. terminals of the bridge connected rectifier. The inverter circuit 10' in FIG. 6 is electrically the same as in FIG. 3 although in the diagram the parts have been repositioned slightly. However, the D.-C. terminals 9 of the inverter correspond to the D.-C. terminals 9 of the inverter in FIG. 3 and are connected to the D.-C. terminals 8 of the bridge connected rectifier 6. It will, therefore, be understood that in FIG. 6 the windings 35 and 36 are closely coupled by being mounted on the same magnetic core and the windings 11' and 33 are closely coupled by being mounted on another magnetic core.

In the operation of FIG. 6 when the inverter is turned off by having its gate electrodes phased back 90 degrees there will be no average D.-C. voltage across the inverter terminals 9 and the full boosting voltage of the winding 33 will be impressed across the winding 36 to induce a full boosting voltage in the series winding 35 and hence in the load circuit. As the inverter is turned on more and more by phasing its gate electrodes back toward 180 degrees the D.-C. voltage of the inverter 10' between its terminal 9 will increase in a bucking direction relative to the D.-C. output of the rectifier bridge 6 between its terminals 8 and the bridge rectifier 6 will act as a switch to reverse the effect of this bucking D.-C. voltage so that it will subtract in the A.-C. circuit from the voltage of the winding 33 thus lower the voltage impressed on the high voltage winding 36 and hence the voltage induced in the series winding 35. In the neutral condition of the circuit the inverter voltage when reflected through the rectifier bridge 6 will be equal and opposite to the voltage of the boosting winding 33 so that the regulator will produce neither buck nor boost. As the inverter is turned more fully on the bucking voltage of the inverter will predominate over the boosting voltage of the winding 33 so that the polarity of the net voltage impressed on the high voltage 36 of the transformer 34 will reverse and produce a bucking series voltage relative to the load in the low voltage series winding 35.

As in the previously described figures, the phase control of the silicon control rectifiers 12 of the inverter 10' can be manual or automatic such as by the use of a control circuit shown in FIG. 1.

In the modification shown in FIG. 7, the series transformer is similar to the series transformer in FIG. 5 in that it has a series low voltage winding 38 and twin high voltage windings connected respectively in series with the diodes 7 of the rectifier 6', these windings being indicated at 39' and 40', 39' corresponding to 39 in FIG. 5, and 40' corresponding to 40 in FIG. 5. In addition, there is a fourth winding section 39″ which is related to the series winding 38 in the same way that the winding 39 is related to the winding 38 in FIG. 5 so far as the alternating current filter capacitor 31′ is concerned, i.e. the latter is connected across 38 and 39″ in series.

The inverter of FIG. 7 is also generally the same as that of FIG. 5 except that the shunt connected inverter autotransformer winding 11″ is a voltage step-down autotransformer instead of a step-up autotransformer as in FIG. 5. Consequently the silicon controlled rectifiers 12 operate at lower voltage and higher current in FIG. 7 than in FIG. 5, other things being equal. The circuit of FIG. 7 has a voltage buck and voltage boost action similar to FIG. 5, the boosting voltage for the separate half cycles being supplied by the voltages of the winding 11″ between its electrical midpoint corresponding to interconnected inverter and rectifier terminals 8 and 9 and the points on the winding 11″ to which the windings 39′ and 40 are connected, the D.-C. voltage of the inverter appearing between the points 9. Consequently, with the inverter turned off, i.e., the gates 15 of its silicon control rectifiers phased back 90 degrees the voltage impressed on the windings 39 and 40 during alternate half cycles will be the appropriate voltages of the winding 11″ between its electrical midpoint and the points thereon to which the respective windings 39′ and 40 are connected.

As the inverter is turned on further and further by phasing back its gates toward 180 degrees the counter D.-C. voltage of the inverter will increase, thus reducing the net series boosting voltage in the load circuit until it becomes zero and then increases in the negative or bucking direction when the D.-C. voltage of the inverter exceeds the boosting voltage supplied by parts of the winding 11″.

Again as in the previous figures, the control of the inverter may be automatic or manual, a suitable automatic means being shown in FIG. 1.

In FIGS. 3–7 inclusive the low voltage series transformer winding 35 or 38 is on a magnetic core which has magnetizing current. A capacitor 31′ is always connected across a winding on this core to supply this magnetizing current. At fundamental frequency this circuit is in resonance and puts no appreciable load on the series circuit. The capacitor has relatively low impedance to current harmonic produced by the rectifier. This filters the series voltage and minimizes the harmonics in the output wave shape. In these figures this capacitor is connected across a higher voltage winding 6 or 36 or 38–39 of this transformer to reduce the number of microfarads required to supply magnetizing current and obtain the desired low impedance to harmonics of current produced by the rectifier. This balance of inductive and capacitive impedance is necessary for correct operation of the circuit when the load impedance is high. The series transformer performs several functions in most of the figures.

(1) It steps up the voltage for the rectifier.
(2) It steps up the voltage for the filter capacitor.
(3) Its magnetizing current balances the capacitor current at the fundamental frequency.

Under some conditions of load and control range it may be desirable to connect the inverter across the supply circuit on the load side of the series regulating transformer 34 or rectifier 6. In many applications the load side operation of the inverter is about as good as connecting it in shunt with the A.-C. supply circuit on the source side of rectifier 6 or the series transformer.

While there have been shown and described particular single phase embodiments of the invention, it will be obvious to those skilled in the art that polyphase embodiments and other changes and modifications may be made without departing from the invention, and therefore it is intended by the appended claims to cover all such changes and modifications as fall within the true spirit and scope of the invention.

What I claim as new and desire to secure by Letters Patent of the United States is:

1. In combination, an alternating current supply circuit, an electronic converter consisting of a rectifier and a phase controlled inverter with a D.-C. link therebetween, said rectifier having its alternating current side effectively connected in series circuit relation with said supply circuit, said inverter having its alternating current side effectively connected in shunt circuit relation to said supply circuit, said inverter having its alternating current ter to control the voltage of said supply circuit.

2. The combination as defined in claim 1, with a capacitor and an inductor connected across the alternating current side of rectifier and tuned to resonance at the frequency of said supply circuit.

3. The combination as defined in claim 1 with a series transformer for connecting said rectifier in said supply circuit, and a capacitor connected across a winding of said series transformer for supplying the magnetizing current of the latter.

4. A static voltage regulator for an alternating current supply circuit comprising, in combination, an electric valve rectifier having its alternating current side effectively connected in series circuit relation with said supply circuit and direct current side, a phase controlled electric valve inverter having an alternating current side effectively connected in shunt circuit relation with said supply circuit and a direct current side connected to the direct current side of said rectifier whereby the voltage of the direct current side of said inverter is reflected through said rectifier as an alternating series regulating voltage in said supply circuit, and means for controlling said inverter to vary the magnitude of said regulating voltage.

5. A static voltage regulator for an alternating current supply circuit comprising, in combination, a multi-diode rectifier having an alternating current side effectively connected in series circuit relation with said supply circuit and a direct current side, a phase controlled line voltage commutated multi silicon controlled rectifier type inverter having an alternating current side effectively connected in shunt circuit relation with said supply circuit and a direct current side connected to the direct current side of said multi-diode rectifier whereby the voltage of the direct current side of said inverter is reflected through said rectifier as a bucking alternating series regulating voltage in said supply circuit, and automatic means responsive to the voltage of said supply circuit for phase controlling said silicon controlled rectifiers of said inverter to maintain the voltage of said supply circuit substantially constant.

6. In an alternatng current circuit having a source end and a load end, a bridge connected diode rectifier having an alternating current side serially connected in said circuit and a direct current side, a bi-phase phase controlled electric valve inverter having an A.-C. side effectively connected in shunt with said circuit and a D.-C. side connected to the D.-C. side of said bridge connected rectifier, and means for phase controlling the valves of said inverter so as to introduce into said alternating current circuit through said rectifier a variable series alternating bucking voltage.

7. A circuit as in claim 6 in which a filter comprising an inductance and a capacitance are effectively connected in shunt across the A.-C. side of said bridge connected rectifier.

8. A circuit as in claim 6 in which a D.-C. filter capacitor is connected in shunt across the D.-C. sides of the bridge connected rectifier and the bi-phase connected inverter.

9. An alternating current circuit having a source end and a load end, a bridge connected diode rectifier having its alternating current terminals serially connected in said circuit, a bi-phase silicon controlled rectifier line commutated inverter having an inverter transformer connected in shunt circuit relation with said alternating current supply circuit, said inverter having D.-C. terminals connected to the D.-C. terminals of said bridge connected rectifier, and means for phase controlling the gates of said silicon controlled rectifiers between angles of 90 electrical degrees and 180 electrical degrees after their reverse voltages pass through zero to provide a D.-C. inverter voltage which when reflected through said bridge connected rectifier constitutes a variable alternating series bucking voltage in said supply circuit.

10. In combination, an alternating current circuit, a phase controlled electric valve inverter having a direct current link with a multi-diode rectifier, said inverter including an inverter transformer for effectively connecting said inverter across said supply circuit, means for effectively serially connecting said rectifier in said supply circuit, said inverter transformer having means for causing a predetermined alternating boosting voltage to be serially inserted in said supply circuit, and means for phase controlling said inverter to cause a variable alternating bucking voltage to be serially inserted in said supply circuit through said rectifier.

11. In combination, an alternating current circuit, a phase controlled electric valve inverter having a direct current link with a multi-diode rectifier, said inverter including an inverter transformer for effectively connecting said inverter across said circuit, means for effectively serially connecting said rectifier in said supply circuit, said inverter transformer having an auxiliary winding serally connected in said supply circuit for causing a predetermined alternating boosting voltage to be serially inserted in said supply circuit and means for phase controlling said inverter to cause a variable alternating bucking voltage to be serially inserted in said supply circuit through said rectifier.

12. In combination, an alternating current circuit, a phase controlled electric valve inverter having a direct current link with a multi-diode rectifier, said inverter including an inverter transformer for effectively connecting said inverter across said supply circuit, means for effectively serially connecting said rectifier in said supply circuit, said inverter transformer having means for causing a predetermined alternating boosting voltage to be serially inserted in said supply circuit through said rectifier, and means for phase controlling said inverter to cause a variable alternating bucking voltage to be serially inserted in said supply circuit through said rectifier.

13. An alternating current supply circuit having a source end and a load end, a full wave bridge connected diode rectifier serially connected in said circuit, an electric valve inverter effectively connected in shunt with said circuit through an inverter transformer having an extended winding for introducing a fixed amount of voltage boost in said circuit, and means for controlling said inverter whereby its D.-C. voltage when reflected through said rectifier produces a variable series bucking voltage in said supply circuit.

14. A circuit as in claim 13 in which said inverter transformer reduces the voltage of the valves of said inverter below the voltage of said supply circuit.

15. An alternating current supply circuit having a source end and a load end, a series transformer having a low voltage winding serially connected in said circuit and having a high voltage winding, a full wave bridge connected diode rectifier having alternating current terminals connected respectively to the terminals of the high voltage winding of said series transformer, a phase controlled electric valve inverter having an alternating current side effectively connected in shunt with said supply circuit and having a D.-C. side connected to the D.-C. side of said full wave bridge connected rectifier, and means for phase controlling the valves of said inverter so as to produce a variable D.-C. voltage which when reflected through said rectifier acts as a series alternating bucking voltage with respect to the high voltage winding of said series transformer so as to cause the low voltage winding thereof to produce a variable bucking series voltage in said supply circuit.

16. An alternating current supply circuit having a source end and a load end, a series transformer having a low voltage winding serially connected in said circuit and a high voltage winding, a full wave bridge connected rectifier having alternating current terminals connected respectively to the terminals of said high voltage winding, a bi-phase connected inverter having a pair of silicon controlled rectifiers, said inverter having a transformer with a winding connected in shunt circuit relation with said supply circuit and having an extended winding connected in series with the low voltage winding of said series transformer for producing a fixed voltage boost in said supply circuit, said inverter having a D.-C. side connected to the D.-C. side of said full wave bridge connected rectifier and means for controlling said silicon controlled rectifiers so as to produce a variable inverter D.-C. voltage which when reflected through said full wave bridge connected rectifier produces a bucking series alternating voltage with respect to the high voltage winding of said series transformer whereby said series transformer low voltage winding produces variable alternating series bucking voltage in said supply circuit.

17. An alternating current supply circuit having a source end and a load end, a series transformer having a low voltage winding serially connected in said supply circuit and having a high voltage winding, a full wave bridge connected diode rectifier having alternating current terminals connected respectively to the terminals of the high voltage winding of said series transformer, a full wave bridge connected silicon controlled rectifier inverter having an alternating current side connected directly across said supply circuit and a D.-C. side connected to the D.-C. terminals of said full wave bridge connected rectifier, and means for phase controlling the gates of the silicon controlled rectifiers of said inverter so as to produce a variable D.-C. inverter voltage which when reflected through said rectifier acts as a series bucking voltage with respect to said high voltage winding of said series transformer thereby to cause said low voltage winding of said series transformer to introduce a variable series bucking voltage in said A.-C. supply circuit.

18. An alternating current supply circuit having a source end and a load end, a series transformer having a low voltage winding serially connected in said circuit and having twin high voltage windings one end of one of which is connected to one side of said supply circuit and one end of the other of which is connected to the other side of said supply circuit, a pair of rectifier diodes connected respectively to the other terminals of said twin high voltage winding and interconnected for bi-phase rectification, a silicon controlled rectifier valve inverter having a voltage step-up autotransformer with a primary winding connected in shunt circuit relation with said supply circuit and with a pair of equal extended windings on opposite ends thereof for increasing the voltage on said silicon controlled rectifiers, said inverter having a D.-C. side connected to the D.-C. side of the bi-phase rectifier connected diodes, and means for phase controlling the silicon controlled rectifiers of said inverter so as to produce a variable D.-C. inverter voltage which when reflected through said diode rectifiers causes said series transformer to produce variable series voltage in said supply circuit for variation from a maximum boosting value through zero to a maximum bucking value.

19. An alternating current supply circuit having a source end and a load end, a full wave bridge connected diode rectifier, a bi-phase silicon controlled rectifier inverter having an inverter transformer with a winding effectively connected in shunt circuit relation with said supply circuit and with a separate auxiliary winding, a series transformer having a low voltage winding serially connected in said supply circuit and a high voltage winding, the auxiliary winding of said inverter transformer and the high voltage winding of said series transformer being serially connected across the A.-C. terminals of said bridge connected rectifier, the D.-C. side of said inverter being connected to the D.-C. side of said full wave bridge connected rectifier, said auxiliary winding of said inverter transformer applying a voltage to the high voltage winding of said series transformer for causing the latter to insert a series boosting voltage in said A.-C. current supply circuit, and means for phase controlling the silicon controlled rectifiers of said inverter to produce a variable D.-C. inverter voltage which when reflected through the rectifier introduces variable alternating bucking voltage in series with the auxiliary winding of the inverter transformer and the high voltage winding of the series transformer between the A.-C. terminals of said full wave diode rectifier bridge thereby to reduce the voltage on the high voltage winding of the series transformer through zero so as to produce variable amounts of series boosting and bucking voltage in said A.-C. supply circuit.

20. An alternating current supplying circuit having a source end and a load end, a series transformer having a low voltage winding serially connected in said supply circuit and twin high voltage windings connected respectively between the cathodes of a pair of rectifier diodes and symmetrically spaced intermediate points on a step-down inverter autotransformer winding connected across said supply circuit, a pair of silicon controlled rectifier valves having their cathodes connected to the anodes of said diode rectifiers through an inverter smoothing reactor, and means for phase controlling said silicon controlled rectifiers to cause said inverter to produce a variable D.-C. voltage which subtracts from a portion of the voltage of the inverter transformer applied to the high voltage windings of the series transformer so as to produce in said supply circuit a variable magnitude buck and boost alternating regulating voltage.

21. A circuit as in claim 20 in which the series winding of the series transformer has an extension across which is connected a high voltage alternating current filter capacitor.

No references cited.

LLOYD McCOLLUM, *Primary Examiner.*

W. E. RAY, *Assistant Examiner.*